US005354718A

United States Patent [19]

Chu et al.

[11] Patent Number: 5,354,718
[45] Date of Patent: Oct. 11, 1994

[54] CATALYST AND PROCESS FOR ISOPARAFFIN-OLEFIN ALKYLATION

[75] Inventors: Cynthia T-W. Chu, Moorestown; Altaf Husain, Marlton, both of N.J.; Kathleen M. Keville, Beaumont, Tex.; Daria N. Lissy, Glen Mills, Pa.

[73] Assignee: Mobil Oil Corp., Fairfax, Va.

[21] Appl. No.: 42,907

[22] Filed: Apr. 5, 1993

[51] Int. Cl.$^5$ .................. B01J 29/04; B01J 29/28
[52] U.S. Cl. ........................ 502/60; 502/62; 502/64
[58] Field of Search ................ 502/11, 60, 62, 64

[56] References Cited

U.S. PATENT DOCUMENTS

| 3,457,191 | 7/1969 | Erickson et al. | 502/11 |
| 3,509,041 | 4/1970 | Miale | 502/11 |
| 4,078,991 | 3/1978 | Goldstein | 502/11 |
| 4,292,205 | 9/1981 | Bowes | 502/11 |
| 4,582,815 | 4/1986 | Bowes | 502/64 |
| 4,992,615 | 2/1991 | Huss et al. | 585/722 |

FOREIGN PATENT DOCUMENTS

WO9211934 7/1992 PCT Int'l Appl.

*Primary Examiner*—Carl F. Dees
*Attorney, Agent, or Firm*—Alexander J. McKillop; Dennis P. Santini; Edward F. Kenehan, Jr.

[57] ABSTRACT

There are provided a catalyst, a method for making this catalyst, and a process for using this catalyst in the alkylation of an isoparaffin with an olefin to provide an alkylate. The catalyst may be made from an as-synthesized material which, upon calcination, is capable of generating zeolites designated MCM-22. The as-synthesized material is then combined with a binder material, such as alumina, by an extrusion process. The uncalcined bound material may then be ammonium exchanged, followed by a calcination treatment. The as-synthesized material may also be swollen with a suitable swelling agent, such as a cetyltrimethylammonium compound, prior to the binding process.

21 Claims, 2 Drawing Sheets

CATALYST AND PROCESS FOR ISOPARAFFIN-OLEFIN ALKYLATION

CROSS-REFERENCE TO RELATED APPLICATIONS

This application is related to copending U.S. application Ser. No. 07/811,360, filed Dec. 20, 1991, now U.S. Pat. No. 5,250,277, which is a continuation-in-part of copending U.S. application Ser. No. 07/776,718, filed Oct. 15, 1991, now abandoned, which is a continuation of U.S. application Ser. No. 07/640,330, filed Jan. 11, 1991, now abandoned.

BACKGROUND

There is provided herein a catalyst and a method for its preparation. There is also provided herein an isoparaffin-olefin alkylation process carried out in the presence of this catalyst to provide an alkylate product useful, inter alia, as an octane enhancer for gasoline.

As a result of the curtailment in the use of tetraethyl lead as an octane-improving additive for gasoline, not only has the production of unleaded gasoline increased but the octane number specification of all grades of gasoline has increased as well. Isoparaffin-olefin alkylation is a key route to the production of highly branched paraffin octane enhancers which are to be blended into gasolines.

Alkylation involves the addition of an alkyl group to an organic molecule. Thus, an isoparaffin can be reacted with an olefin to provide an isoparaffin of higher molecular weight. Industrially, alkylation often involves the reaction of $C_2$-$C_5$ olefins with isobutane in the presence of an acidic catalyst. Alkylates are valuable blending components for the manufacture of premium gasolines due to their high octane ratings.

In the past, alkylation processes have included the use of hydrofluoric acid or sulfuric acide as catalysts under controlled temperature conditions. Low temperatures are utilized in the sulfuric acid process to minimize the undesirable side reaction of olefin polymerization and the acid strength is generally maintained at 88-94 percent by the continuous addition of fresh acid and the continuous withdrawal of spent acid. The hydrofluoric acid process is less temperature-sensitive and the acid is easily recovered and purified.

The typical types of alkylation currently used to produce high octane gasoline blending component, that is, the hydrofluoric acid and sulfuric acid alkylation processes, have inherent drawbacks including environmental concerns, acid consumption and disposal of corrosive materials. With the increasing demands for octane and the increasing environmental concerns, it has been desirable to develop an alkylation process based on a solid catalyst system. The catalyst of the present invention offers a refiner a more environmentally acceptable alkylation process than the currently used hydrofluoric and sulfuric acid alkylation processes.

Crystalline metallosilicates, or zeolites, have been widely investigated for use in the catalysis of isoparaffin-olefin alkylation. For example, U.S. Pat. No. 3,251,902 describes the use of a fixed bed of ion-exchanged crystalline aluminosilicate having a reduced number of available acid sites for the liquid phase alkylation of $C_4$-$C_{20}$ branched-chain paraffins with $C_2$-$C_{12}$ olefins. The patent further discloses that the $C_4$-$C_{20}$ branched-chain paraffin should be allowed to substantially saturate the crystalline aluminosilicate before the olefin is introduced to the alkylation reactor.

U.S. Pat. No. 3,450,644 discloses a method for regenerating a zeolite catalyst used in hydrocarbon conversion processes involving carbonium ion intermediates.

U.S. Pat. No. 3,549,557 describes the alkylation of isobutane with $C_2$-$C_3$ olefins using certain crystalline aluminosilicate zeolite catalysts in a fixed, moving or fluidized bed system, the olefin being preferably injected at various points in the reactor.

U.S. Pat. No. 3,644,565 discloses the alkylation of a paraffin with an olefin in the presence of a catalyst comprising a Group VIII noble metal present on a crystalline aluminosilicate zeolite, the catalyst having been pretreated with hydrogen to promote selectivity.

U.S. Pat. No. 3,647,916 describes an isoparaffin-olefin alkylation process featuring the use of an ion-exchanged crystalline aluminosilicate, isoparaffin/olefin mole ratios below 3:1 and regeneration of the catalyst.

U.S. Pat. No. 3,655,813 discloses a process for alkylating $C_4$-$C_5$ isoparaffins with $C_3$-$C_9$ olefins using a crystalline aluminosilicate zeolite catalyst wherein a halide adjuvant is employed in the alkylation reactor. The isoparaffin and olefin are introduced into the alkylation reactor at specified concentrations and catalyst is continuously regenerated outside the alkylation reactor.

U.S. Pat. No. 3,893,942 describes an isoparaffin-olefin alkylation process employing, as catalyst, a Group VIII metal-containing zeolite which is periodically hydrogenated with hydrogen in the gas phase to reactivate the catalyst when it has become partially deactivated.

U.S. Pat. No. 3,236,671 discloses the use, in alkylation, of crystalline aluminosilicate zeolites having silica to alumina mole ratios above 3 and also discloses the use of various metals exchanged and/or impregnated on such zeolites.

U.S. Pat. No. 3,706,814 discloses another zeolite catalyzed isoparaffin-olefin alkylation process and further provides for the addition of $C_5+$ paraffins such as Udex raffinate or $C_5+$ olefins to the alkylation reactor feed and the use of specific reactant proportions, halide adjuvants, etc. U.S. Pat. No. 3,624,173 discloses the use, in isoparaffin-olefin alkylation, of zeolite catalysts containing gadolinium.

U.S. Pat. No. 3,738,977 discloses alkylation of paraffins with ethylene employing a zeolite catalyst which possesses a Group VIII metal component, the catalyst having been pretreated with hydrogen.

U.S. Pat. No. 3,865,894 describes the alkylation of $C_4$-$C_6$ isoparaffin with $C_3$-$C_9$ monoolefin employing a substantially anhydrous acidic zeolite, for example acidic zeolite Y (zeolite HY), and a halide adjuvant.

U.S. Pat. No. 3,917,738 describes a process for alkylating an isoparaffin with an olefin using a solid, particulate catalyst capable of absorbing the olefin. The isoparaffin and the olefin are admixed to form a reactant stream in contact with catalyst particles at the upstream end of an adsorption zone after which the reactants are passed concurrently with the catalyst so that a controlled amount of olefin is adsorbed onto the catalyst before the combination of reactants and catalyst is introduced into an alkylation zone. This controlled olefin adsorption is said to prevent polymerization of the olefin during alkylation.

U.S. Pat. No. 4,377,721 describes an isoparaffin-olefin alkylation process utilizing, as catalyst, ZSM-20, preferably HZSM-20 or rare earth cation-exchanged ZSM-20.

U.S. Pat. No. 4,384,161 describes a process for alkylating isoparaffins with olefins to provide alkylate employing as catalyst a large pore zeolite capable of absorbing 2,2,4-trimethylpentane, e.g., ZSM-4, ZSM-20, ZSM-3, ZSM-18, zeolite Beta, faujasite, mordenite, zeolite Y and the rare earth metal-containing forms thereof, and a Lewis acid such as boron trifluoride, antimony pentafluoride or aluminum trichloride. The use of a large pore zeolite in combination with a Lewis acid in accordance with this patent is reported to greatly increase the activity and selectivity of the zeolite thereby effecting alkylation with high olefin space velocity and low isoparaffin/olefin ratio.

U.S. Pat. Nos. 4,992,615; 5,012,033; and 5,073,665 describe an isoparaffin-olefin alkylation process utilizing, as a catalyst, a zeolite designated as MCM-22. Copending U.S. application Ser. No. 07/929,550, filed Aug. 13, 1992, now U.S. Pat. No. 5,258,569, describes an isoparaffin-olefin alkylation process utilizing, as a catalyst, a material designated as MCM-36. Copending U.S. application Ser. No. 07/774,482, filed Oct. 10, 1991, now U.S. Pat. No. 5,254,792, describes an isoparaffin-olefin alkylation process utilizing, as a catalyst, a material designated as MCM-49.

The catalyst provided herein is made by an unusual method. A conventional catalyst preparation involves the combination of a zeolite material with a binder in a particular extrusion method. According to this particular method, the as-synthesized form of the zeolite mixed with a suitable binding material, such as certain forms of alumina, and extruded to form extrudate. The alumina used in this extrusion process usually includes a substantial amount of chemically bound water in the form of hydroxyl groups covalently bonded to aluminum atoms.

After the extrudate is formed, it is customary to calcine the extrudate. This calcination serves two purposes. First, the calcination serves to decompose and/or oxidize residual organic directing agent includes in the as-synthesized form of the zeolite. Second, this calcination serves to improve the crush strength by a condensation reaction, whereby hydroxyl groups associated with aluminum atoms in the binder react to form Al-O-Al linkages and to liberate water.

After the extrudate is calcined, it is customary to convert the calcined form of the zeolite therein to the hydrogen form by a two step technique. This two step technique involves (1) exchanging ions in the zeolite with ammonium ions, followed by (2) subjecting the extrudate to a second calcination treatment to decompose ammonium ions.

In accordance with the catalyst preparation method provided herein, it has been discovered that, for a particular class of crystalline oxide materials, the initial calcination treatment of the initially formed extrudate may be eliminated. Surprisingly, the elimination of this initial calcination results in catalysts which have superior properties in comparison with catalysts prepared using this conventional initial calcination treatment.

SUMMARY

There is provided a method for preparing a catalyst, said method comprising the steps of:

(a) preparing a reaction mixture comprising a source of at least one oxide, water and an organic directing agent, wherein said reaction mixture is capable of forming a crystalline oxide material upon being subjected to sufficient crystallization conditions, said crystalline oxide material, in as-synthesized form, having an X-ray diffraction pattern comprising the following lines:

| d(A) | I/I$_o$ |
|---|---|
| 12.18–12.73 | m-vs |
| 10.93–11.41 | w-s |
| 6.74–7.04 | w-m |
| 4.37–4.60 | w-m |
| 3.84–4.03 | w-vs |
| 3.50–3.62 | w-m |
| 3.37–3.51 | m-vs |
| 3.27–3.41 | w-s; |

(b) maintaining said reaction mixture of step (a) under conditions sufficient to form said as-synthesized crystalline oxide material;

(c) recovering said as-synthesized crystalline oxide material comprising residual organic directing agent;

(d) mulling and extruding the uncalcined, as-synthesized crystalline material recovered in step (c) with a binder material under conditions sufficient to form an extrudate having a green strength sufficient to withstand processing as described in subsequent steps of this method, the crush strength of the green strength extrudate being capable of being improved by calcination thereof;

(e) exchanging ions in the crystalline material in the green strength extrudate of step (d) with ammonium ions, said extrudate in this step not having been subjected to calcination conditions sufficient decompose and/or oxidize the residue of the organic directing agent in the crystalline oxide material; and (f) calcining the exchanged extrudate of step (e) for the first time under conditions sufficient to (1) decompose ammonium ions, (2) decompose and/or oxidize residual organic directing agent, and (3) convert the green strength extrudate into a calcined extrudate having improved crush strength.

There is also provided a method for DreDarinq a catalyst, under conditions sufficient to form an extrudate having a green (a) preparing a reaction mixture comprising a source of at least one oxide, water and an organic directing agent, wherein said reaction mixture is capable of forming a crystalline oxide material upon being subjected to sufficient crystallization conditions, said crystalline oxide material, in as-synthesized form, having an X-ray diffraction pattern comprising the following lines:

| d(A) | I/I$_o$ |
|---|---|
| 12.18–12.73 | m-vs |
| 10.93–11.41 | w-s |
| 6.74–7.04 | w-m |
| 4.37–4.60 | w-m |
| 3.84–4.03 | w-vs |
| 3.50–3.62 | w-m |
| 3.37–3.51 | m-vs |
| 3.27–3.41 | w-s; |

(b) maintaining said reaction mixture of step (a) under conditions sufficient to form said as-synthesized crystalline oxide material;

(c) recovering said as-synthesized crystalline oxide material comprising residual organic directing agent;

(d) contacting said as-synthesized crystalline material of step (c) with an organic swelling agent under conditions sufficient to swell said as-synthesized material, thereby forming a non-pillared swollen material having an X-ray diffraction pattern comprising the following lines:

| d(A) | $I/I_o$ |
|---|---|
| >32.2 | vs |
| 12.41 ± 0.25 | w–s |
| 3.44 ± 0.07 | w–s |

(e) mulling and extruding the uncalcined, non-pillared swollen material recovered in step (d) with a binder material under conditions sufficient to form an extrudate having a green strength sufficient to withstand processing as described in subsequent steps of this method, the crush strength of the green strength extrudate being capable of being improved by calcination thereof;

(f) exchanging ions in the crystalline material in the green strength extrudate of step (e) with ammonium ions, said extrudate in this step not having been subjected to calcination conditions sufficient to decompose and/or oxidize the residue of the organic directing agent or the organic swelling agent in the non-pillared swollen material; and (g) calcining the exchanged extrudate of step (f) for the first time under conditions sufficient to (1) decompose ammonium ions, (2) decompose and/or oxidize residual organic directing agent and organic swelling agent, and (3) convert the green strength extrudate into a calcined extrudate having improved crush strength.

There are also provided catalysts prepared by these methods and isoparaffin-olefin alkylation processes carried out with these catalysts.

EMBODIMENTS

Figure 1:
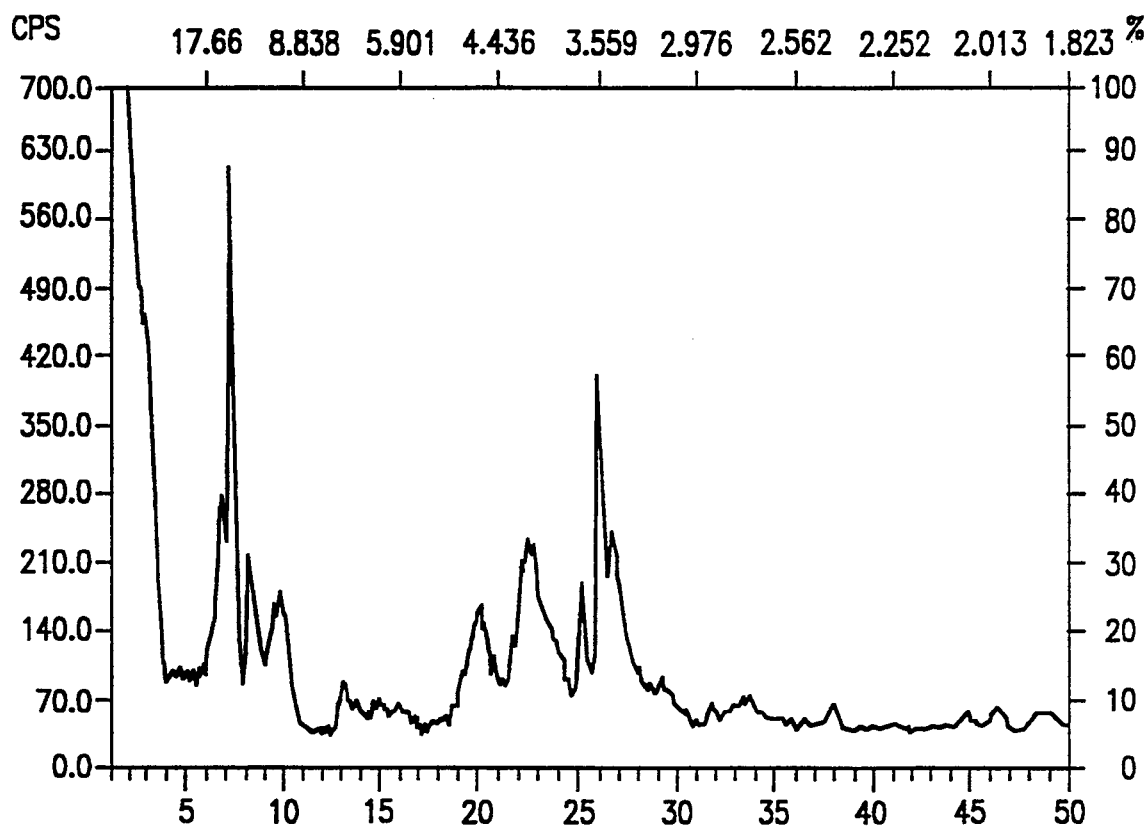
FIG. 1 is an X-ray diffraction pattern of an as-synthesized form of a layered material which may be swollen and pillared.

Isoparaffin-light olefin alkylation plays an important role in the manufacture of high octane gasoline blending stocks with alkylate typically comprising 10–15% of the gasoline pool. Alkylate is an especially valuable component of the gasoline pool as it possesses both high research and motor octane (low sensitivity) numbers, contains no olefins or aromatics and little or no sulfur, demonstrates excellent stability and is clean burning. One measure of the selectivity of an alkylation catalyst is the $C_{9+}$ yield. This fraction generally results from oligomerization of the feed olefins resulting in a loss of alkylate yield, reduced alkylate quality and the possible formation of an acidic sludge fraction. The alkylation catalyst employed in the process of this invention provides reduced $C_{9+}$ yields relative to such known alkylation catalysts as zeolite HY, e.g., as disclosed in U.S. Pat. No. 3,865,894 referred to above.

The product produced by the process of this invention is of high quality based on both research and motor octane numbers and as such may be particularly well suited for blending into the gasoline pool.

The particular class of crystalline oxide materials which may be used in the present catalyst preparation method, wherein there is no initial calcination prior to ion exchange with ammonium ions, includes the as-synthesized forms of materials designated as MCM-22, MCM-36 and MCM-49. Materials designated MCM-22 and method for their preparation are disclosed in the aforementioned U.S. Pat. Nos. 4,992,615; 5,012,033; and 5,073,665. Materials designated MCM-49 and methods for their preparation are disclosed in copending U.S. patent application No. 07/802,938, filed Dec. 6, 1991, now U.S. Pat. No. 5,236,575 MCM-36 and methods for its preparation are described in the aforementioned U.S. application Ser. No. 07/811,360, filed Dec. 20, 1991, now U.S. Pat. No. 5,250,277. The entire disclosures of the patents and applications referred to in this paragraph are expressly incorporated herein by reference.

MCM-36 may be prepared from an intermediate material which is crystallized in the presence of a hexamethyleneimine directing agent and which, if calcined, without being swollen would be transformed into a material having an X-ray diffraction pattern as shown in Table 1.

TABLE 1

| Interplanar d-Spacing (A) | Relative Intensity, $I/I \times 100$ |
|---|---|
| 12.36 ± 0.2 | m–vs |
| 11.03 ± 0.2 | m–s |
| 8.83 ± 0.14 | m–vs |
| 6.86 ± 0.14 | w–m |
| 6.18 ± 0.12 | m–vs |
| 6.00 ± 0.10 | w–m |
| 5.54 ± 0.10 | w–m |
| 4.92 ± 0.09 | w |
| 4.64 ± 0.08 | w |
| 4.41 ± 0.08 | w–m |
| 4.25 ± 0.08 | w |
| 4.10 ± 0.07 | w–s |
| 4.06 ± 0.07 | w–s |
| 3.91 ± 0.07 | m–vs |
| 3.75 ± 0.06 | w–m |
| 3.56 ± 0.06 | w–m |
| 3.42 ± 0.06 | vs |
| 3 30 ± 0.05 | w–m |
| 3.20 ± 0.05 | w–m |
| 3.14 ± 0.05 | w–m |
| 3.07 ± 0.05 | w |
| 2.99 ± 0.05 | w |
| 2.82 ± 0.05 | w |
| 2.78 ± 0.05 | w |
| 2.68 ± 0.05 | w |
| 2.59 ± 0.05 | w |

The values in this Table and like tables presented hereinafter were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the diffractometer. From these, the relative intensities, 100 $I/I_o$, where $I_o$ is the intensity of the strongest line or peak, and d (obs.) the interplanar spacing in Angstrom Units (A), corresponding to the recorded lines, were determined. In Tables 1–8, the relative intensities are given in terms of the symbols w=weak, m=medium, s=strong and vs=very strong. In terms of intensities, these may be generally designated as follows:

w = 0–20
m = 20–40
s = 40–60
vs = 60–100

The material having the X-ray diffraction pattern of Table 1 is known as MCM-22. Various forms of MCM-22 are described in U.S. Pat. No. 4,954,325, the entire disclosure of which is incorporated herein by reference. This material can be prepared from a reaction mixture containing sources of alkali or alkaline earth metal (M), sodium or potassium, cation, an oxide of trivalent element X, aluminum, an oxide of tetravalent element Y, e.g., silicon, an organic (R) directing agent, hereinafter more particularly described, and water, said reaction mixture having a composition, in terms of mole ratios of oxides, within the following ranges:

| Reactants | Useful | Preferred |
|---|---|---|
| $YO_2/X_2O_3$ | 10–80 | 10–60 |
| $H_2O/YO_2$ | 5–100 | 10–50 |
| $OH^-/YO_2$ | 0.01–1.0 | 0.1–0.5 |
| $M/YO_2$ | 0.01–2.0 | 0.1–1.0 |
| $R/YO_2$ | 0.05–1.0 | 0.1–0.5 |

In the synthesis method for preparing the material having the X-ray diffraction pattern of Table 1, the source of $YO_2$ must be comprised predominately of solid $YO_2$, for example at least about 30 wt.% solid $YO_2$ in order to obtain the desired crystal product. Where $YO_2$ is silica, the use of a silica source containing at least about 30 wt.% solid silica, e.g., Ultrasil (a precipitated, spray dried silica containing about 90 wt.% $SiO_2$) or HiSil (a precipitated hydrated silica containing about 87 wt.% $SiO_2$, about 6 wt.% free $H_2O$ and about 4.5 wt.% bound $H_2O$) of hydration favors crystal formation from the above mixture and is a distinct improvement over the synthesis method taught in U.S. Pat. No. 4,439,409. If another source of silica, e.g., Q-Brand (a sodium silicate comprised of about 28.8 wt.% $SiO_2$, 8.9 wt % $Na_2O$ and 62.3 wt.% $H_2O$), is used, crystallization yields little or none of the crystalline material having the X-ray diffraction pattern of Table 1. Impurity phases of other crystal structures, e.g., ZSM-12, are prepared in the latter circumstance. Preferably, therefore, the $YO_2$, e.g., silica, source contains at least about 30 wt.% solid $YO_2$, e.g., silica, and more preferably at least about 40 wt.% solid $YO_2$, e.g., silica.

Crystallization of the crystalline material having the X-ray diffraction pattern of Table 1 can be carried out at either static or stirred conditions in a suitable reactor vessel, such as for example, polypropylene jars or teflon lined or stainless steel autoclaves. The total useful range of temperatures for crystallization is from about 80° C. to about 225° C. for a time sufficient for crystallization to occur at the temperature used, e.g., from about 24 hours to about 60 days. Thereafter, the crystals are separated from the liquid and recovered.

The organic directing agent for use in synthesizing the present crystalline material from the above reaction mixture may be hexamethyleneimine which has the following structural formula:

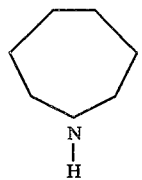

Other organic directing agents which may be used include 1,4-diazacycloheptane, azacyclooctane, aminocycloheptane, aminocyclohexane, aminocycloheptane, aminocyclopentane, N,N,N-trimethyl-1-adamantanammonium ions, and N,N,N-trimethyl-2-adamantanammonium ions. In general, the organic directing agent may be selected from the group consisting of heterocyclic imines, cycloalkyl amines and adamantane quaternary ammonium ions.

It should be realized that the reaction mixture components can be supplied by more than one source. The reaction mixture can be prepared either batchwise or continuously. Crystal size and crtystallization time of the crystalline material will vary with the nature of the reaction mixture employed and the crystallization conditions.

Synthesis of crystals may be facilitated by the presence of at least 0.01 percent, e.g., 0.10 percent or 1 percent, seed crystals (based on total weight) of crystalline product.

The crystalline material having the X-ray diffraction pattern of Table 1 passes through an intermediate stage. The material at this intermediate stage has a different X-ray diffraction pattern than that set forth in Table 1. It has further been discovered that this intermediate material is swellable with the use of suitable swelling agents such as cetyltrimethylammonium compounds, e.g., cetyltrimethylammonium hydroxide. However, when this swollen intermediate material is calcined, even under mild conditions, whereby the swelling agent is removed, the material can no longer be swollen with such swelling agent. By way of contrast it is noted that various layered silicates such as magadiite and kenyaite may be swellable with cetyltrimethylammonium compounds both prior to and after mild calcination.

The present swollen products may have relatively high interplanar distance (d-spacing), e.g., greater than about 6 Angstrom, e.g., greater than about 10 Angstrom and even exceeding 30 Angstrom. These swollen materials may be converted into pillared materials. These pillared materials, particularly silica pillared materials, may be capable of being exposed to severe conditions such as those encountered in calcination, e.g., at temperatures of about 450° C. for about two or more hours, e.g., four hours, in nitrogen or air, without significant decrease, e.g., less than about 10%, in interlayer distance.

The material having the X-ray diffraction pattern of Table 1, when intercepted int eh swellable, intermediate state, prior to final calcination, may have the X-ray diffraction pattern shown in Table 2.

TABLE 2

| d(A) | $I/I_o$ |
|---|---|
| 13.53 ± 0.2 | m–vs |
| 12.38 ± 0.2 | m–vs |
| 11.13 ± 0.2 | w–s |
| 9.15 ± 0.15 | w–s |
| 6.89 ± 0.15 | w–m |
| 4.47 ± 0.10 | w–m |

TABLE 2-continued

| d(A) | I/I$_o$ |
|---|---|
| 3.95 ± 0.08 | w-vs |
| 3.56 ± 0.06 | w-m |
| 3.43 ± 0.06 | m-vs |
| 3.36 ± 0.05 | w-s |

An X-ray diffraction pattern trace for an example of such an as-synthesized, swellable material is shown in FIG. 1. A particular example of such an as-synthesized, swellable material is the material of Example 1 of the aforementioned U.S. Pat. No. 4,954,325. This material of Example 1 of U.S. Pat. No. 4,954,325 has the X-ray diffraction pattern given in the following Table 3.

TABLE 3

| 2 Theta | d(A) | I/I$_o$ × 100 |
|---|---|---|
| 3.1 | 28.5 | 14 |
| 3.9 | 22.7 | <1 |
| 6.53 | 13.53 | 36 |
| 7.14 | 12.38 | 100 |
| 7.94 | 11.13 | 34 |
| 9.67 | 9.15 | 20 |
| 12.85 | 6.89 | 6 |
| 13.26 | 6.68 | 4 |
| 14.36 | 6.17 | 2 |
| 14.70 | 6.03 | 5 |
| 15.85 | 5.59 | 4 |
| 19.00 | 4.67 | 2 |
| 19.85 | 4.47 | 22 |
| 21.56 | 4.12 | 10 |
| 21.94 | 4.05 | 19 |
| 22.53 | 3.95 | 21 |
| 23.59 | 3.77 | 13 |
| 24.98 | 3.56 | 20 |
| 25.98 | 3.43 | 55 |
| 26.56 | 3.36 | 23 |
| 29.15 | 3.06 | 4 |
| 31.58 | 2.833 | 3 |
| 32.34 | 2.768 | 2 |
| 33.48 | 2.676 | 5 |
| 34.87 | 2.573 | 1 |
| 36.34 | 2.472 | 2 |
| 37.18 | 2.418 | 1 |
| 37.82 | 2.379 | 5 |

Taking into account certain modifications, this swellable material may be swollen and pillared by methods generally discussed in the aforementioned U.S. Pat. No. 4,859,648, the entire disclosure of which is expressly incorporated herein by reference. The present modifications are discussed hereinafter and include the selection of proper swelling pH and swelling agent.

Upon being swollen with a suitable swelling agent, such as a cetyltrimethylammonium compound, the swollen material may have the X-ray diffraction pattern shown in Table 4.

TABLE 4

| d(A) | I/I$_o$ |
|---|---|
| >32.2 | vs |
| 12.41 ± 0.25 | w-s |
| 3.44 ± 0.07 | w-s |

The X-ray diffraction pattern of this swollen material may have additional lines with a d(A) spacing less than the line at 12.41 ±0.25, but none of said additional lines have an intensity greater than the line at the d(A) spacing of 12.41±0.25 or at 3.44±0.07, whichever is more intense. More particularly, the X-ray diffraction pattern of this swollen material may have the lines shown in the following Table 5.

TABLE 5

| d(A) | I/I$_o$ |
|---|---|
| >32.2 | vs |
| 12.41 ± 0.25 | w-s |
| 11.04 ± 0.22 | w |
| 9.28 ± 0.19 | w |
| 6.92 ± 0.14 | w |
| 4.48 ± 0.09 | w-m |
| 3.96 ± 0.08 | w-m |
| 3.57 ± 0.07 | w-m |
| 3.44 ± 0.07 | w-s |
| 3.35 ± 0.07 | w |

Even further lines may be revealed upon better resolution of the X-ray diffraction pattern. For example, the X-ray diffraction pattern may have additional lines at the following d(A) spacings intensities given in parentheses): 16.7±4.0 (w-m); 6.11±0.24 (w); 4.05±0.08 (w); and 3.80±0.08 (w) .

In the region with d <9 A, the pattern for the swollen material is essentially like the one given in Table 2 for the unswollen material, but with the possibility of broadening of peaks.

Figure 2:
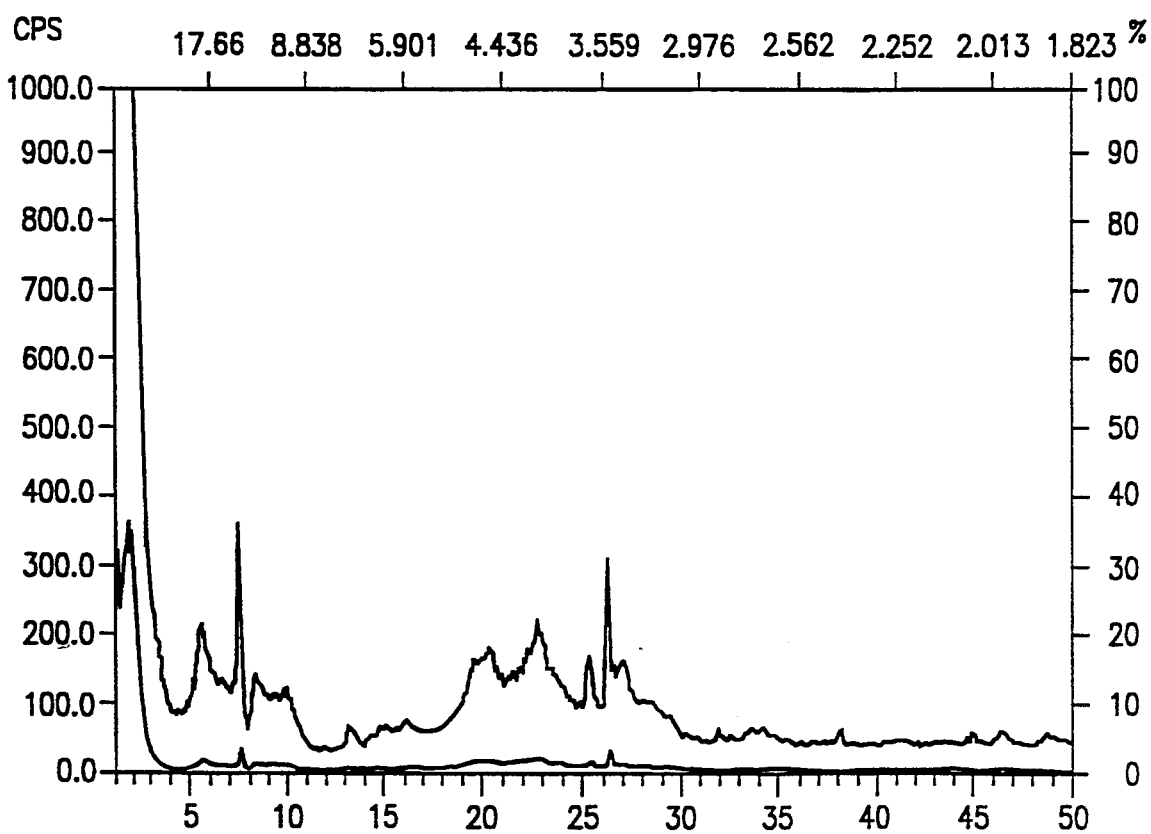
FIG. 2 is an X-ray diffraction pattern of a swollen form of the material having the X-ray diffraction pattern shown in FIG. 1.

An X-ray diffraction pattern trace for an example of such a swollen material is shown in FIG. 2. The upper profile is a 10-fold magnification of the lower profile in FIG. 2.

Upon being pillared with a suitable polymeric oxide, such as polymeric silica, the swollen material having the X-ray diffraction pattern shown in Table 4 may be converted into a material having the X-ray diffraction pattern shown in Table 6.

TABLE 6

| d(A) | I/I$_o$ |
|---|---|
| >32.2 | vs |
| 12.38 ± 0.25 | w-m |
| 3.42 ± 0.07 | w-m |

The X-ray diffraction pattern of this pillared material may have additional lines with a d(A) spacing less than the line at 12.38±0.25, but none of said additional lines have an intensity greater than the line at the d(A) spacing of 12.38±0.25 or 3.42±0.07, whichever is more intense. More particularly, the X-ray diffraction pattern of this pillared material may have the lines shown in the following Table 7.

TABLE 7

| d(A) | I/I$_o$ |
|---|---|
| >32.2 | vs |
| 12.38 ± 0.25 | w-m |
| 10.94 ± 0.22 | w-m |
| 9.01 ± 0.18 | w |
| 6.88 ± 0.14 | w |
| 6.16 ± 0.12 | w-m |
| 3.93 ± 0.08 | w-m |
| 3.55 ± 0.07 | w |
| 3.42 ± 0.07 | w-m |
| 3.33 ± 0.07 | w-m |

Even further lines may be revealed upon better resolution of the X-ray diffraction pattern. For example, the X-ray diffraction pattern may have additional lines at the following d(A) spacings intensities given in parentheses): 5.59±0.11 (w); 4.42±0.09 (w); 4.11±0.08 (w); 4.04±0.08 (w); and 3.76±0.08 (w) .

Figure 3:
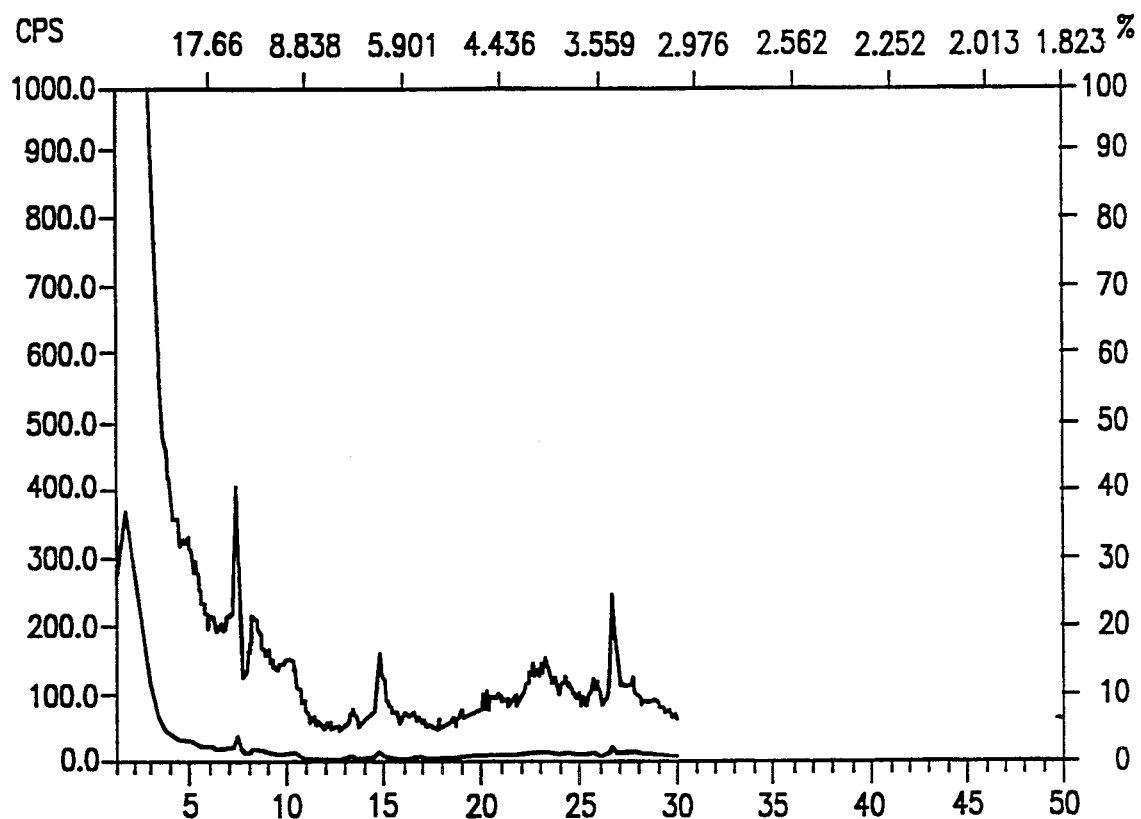
FIG. 3 is an X-ray diffraction pattern of the pillared form of the layered material having the X-ray diffraction pattern shown in FIG. 1.

An X-ray diffraction pattern trace for an example of such a pillared material is given in FIG. 3. The upper profile is a 10-fold magnification of the lower profile in FIG. 3.

If the material swollen with a suitable swelling agent is calcined without prior pillaring another material is produced. For example, if the material which is swollen but not pillared is calcined in air for 6 hours at 540° C., a very strong line at a d(A) spacing of greater than 32.2 will no longer be observed. By way of contrast, when the swollen, pillared material is calcined in air for 6 hours at 540° C., a very strong line at a d(A) spacing of greater than 32.2 will still be observed, although the precise position of the line may shift.

An example of a swollen, non-pillared material, which has been calcined, has the pattern as shown in Table 8.

TABLE 8

| 2 Theta | d(A) | $I/I_o \times 100$ | |
|---------|------|-------|---|
| 3.8 | 23.3 | 12 | |
| 7.02 | 12.59 | 100 | |
| 8.02 | 11.02 | 20 | |
| 9.66 | 9.16 | 14 | |
| 12.77 | 6.93 | 7 | |
| 14.34 | 6.18 | 45 | |
| 15.75 | 5.63 | 8 | |
| 18.19 | 4.88 | 3 | |
| 18.94 | 4.69 | 3 | |
| 19.92 | 4.46 | 13 | broad |
| 21.52 | 4.13 | 13 | shoulder |
| 21.94 | 4.05 | 18 | |
| 22.55 | 3.94 | 32 | |
| 23.58 | 3.77 | 16 | |
| 24.99 | 3.56 | 20 | |
| 25.94 | 3.43 | 61 | |
| 26.73 | 3.33 | 19 | |
| 31.60 | 2.831 | 3 | |
| 33.41 | 2.682 | 4 | |
| 34.62 | 2.591 | 3 | broad |
| 36.36 | 2.471 | 1 | |
| 37.81 | 2.379 | 4 | |

The X-ray powder pattern shown in Table 8 is similar to that shown in Table 1 except that most of the peaks in Table 8 are much broader than those in Table 1.

Figure 4:
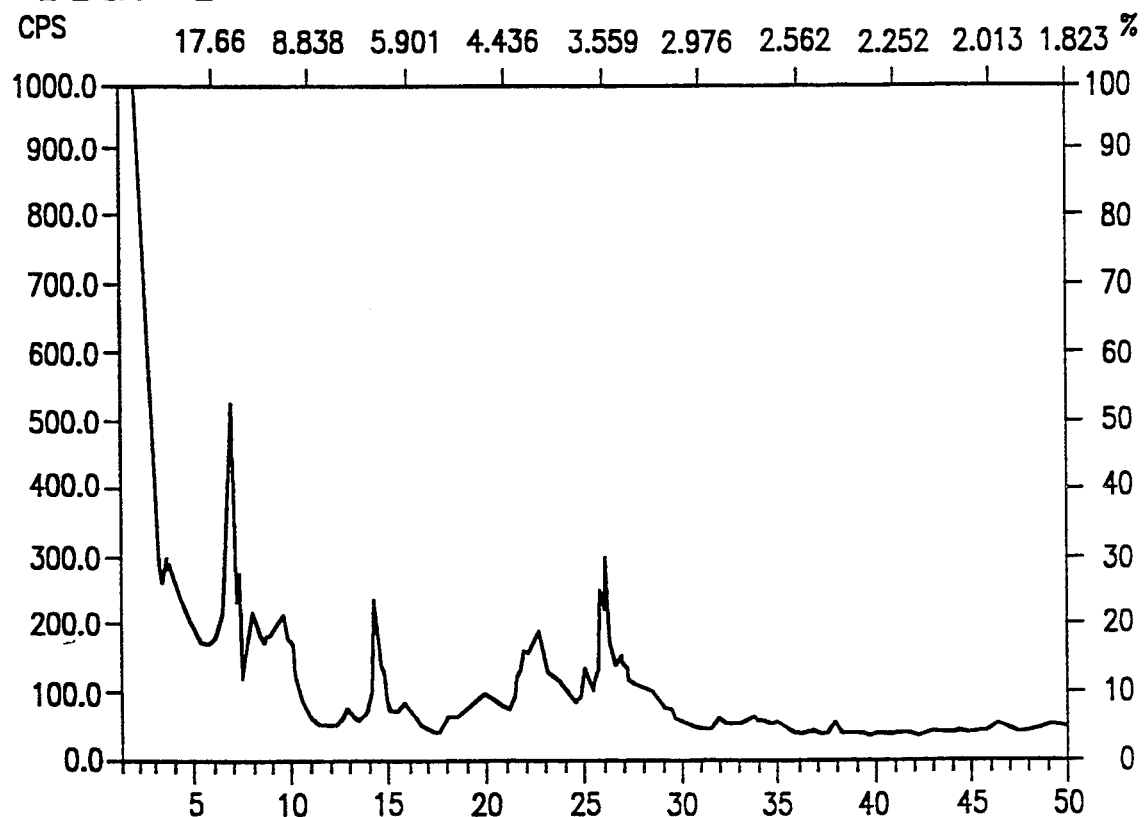
FIG. 4 is an X-ray diffraction pattern of the calcined form of the swollen material having the X-ray diffraction pattern shown in FIG. 2.

An X-ray diffraction pattern trace for an example of the calcined material corresponding to Table 8 is given in FIG. 4.

As mentioned previously, the calcined material corresponding to the X-ray diffraction pattern of Table 1 is designated MCM-22. For the purposes of the present disclosure, the pillared material corresponding to the X-ray diffraction pattern of Table 6 is designated herein as MCM-36. The swollen material corresponding to the X-ray diffraction pattern of Table 4 is designated herein as the swollen MCM-22 precursor. The as-synthesized material corresponding to the X-ray diffraction pattern of Table 2 is referred to herein, simply, as the MCM-22 precursor.

The layers of the swollen material of this disclosure may have a composition involving the molar relationship:

$$X_2O_3:(n)YO_2,$$

wherein X is a trivalent element, such as aluminum, boron, iron and/or gallium, preferably aluminum, Y is a tetravalent element such as silicon and/or germanium, preferably silicon, and n is at least about 5, usually from about 10 to about 150, more usually from about 10 to about 60, and even more usually from about 10 to about 40.

To the extent that the layers of the swollen MCM-22 precursor and MCM-36 have negative charges, these negative charges are balanced with cations. For example, expressed in terms of moles of oxides, the layers of the swollen MCM-22 precursor and MCM-36 may have a ratio of 0.5 to 1.5 $R_2O:X_2O_3$, where R is a monovalent cation or 1/m of a cation of valency m.

MCM-36 adsorbs significant amounts of commonly used test adsorbate materials, i.e., cyclohexane, n-hexane and water. Adsorption capacities for this pillared material, especially the silica pillared material, may range at room temperature as follows:

| Adsorbate | Capacity, Wt. Percent |
|-----------|----------------------|
| n-hexane | 17–40 |
| cyclohexane | 17–40 |
| water | 10–40 | wherein cyclohexane and n-hexane sorption are measured at 20 Torr and water sorption is measured at 12 Torr.

The swellable material, used to form the swollen material of the present disclosure, may be initially treated with a swelling agent. Such swelling agents are materials which cause the swellable layers to separate by becoming incorporated into the interspathic region of these layers. The swelling agents are removable by calcination, preferably in an oxidizing atmosphere, whereby the swelling agent becomes decomposed and/or oxidized.

Suitable swelling agents may comprise a source of organic cation, such as quaternary organoammonium or organophosphonium cations, in order to effect an exchange of interspathic cations. Organoammonium cations, such as n-octylammonium, showed smaller swelling efficiency than, for example, cetyltrimethylammonium. A pH range of 11 to 14, preferably 12.5 to 13.5 is generally employed during treatment with the swelling agent.

The as-synthesized material is preferably not dried prior to being swollen. This as-synthesized material may be in the form of a wet cake having a solids content of less than 30 % by weight, e.g., 25 wt % or less.

The foregoing swelling treatment results in the formation of a layered oxide of enhanced interlayer separation depending upon the size of the organic cation introduced. In one embodiment, a series of organic cation exchanges can be carried out. For example, an organic cation may be exchanged with an organic cation of greater size, thus increasing the interlayer separation in a step-wise fashion. When contact of the layered oxide with the swelling agent is conducted in aqueous medium, water is trapped between the layers of the swollen species.

The organic-swollen species may be treated with a compound capable of conversion, e.g., by hydrolysis and/or calcination, to pillars of an oxide, preferably to a polymeric oxide. Where the treatment involves hydrolysis, this treatment may be carried out using the water already present in organic-swollen material. In this case, the extent of hydrolysis may be modified by varying the extent to which the organic-swollen species is dried prior to addition of the polymeric oxide precursor.

It is preferred that the organic cation deposited between the layers be capable of being removed from the pillard material without substantial disturbance or removal of the interspathic polymeric oxide. For example, organic cations such as cetyltrimethylammonium may be removed by exposure to elevated temperatures, e.g., calcination, in nitrogen or air, or by chemical oxidation preferably after the interspathic polymeric oxide precursor has been converted to the polymeric oxide pillars in order to form the pillared layered product.

These pillared layered products, especially when calcined, exhibit high surface area, e.g., greater than 500 m$^2$/g, and thermal and hydrothermal stability making them highly useful as catalysts or catalytic supports, for hydrocarbon conversion processes, for example, alkylation.

Insertion of the organic cation between the adjoining layers serves to physically separate the layers in such a way as to make the layered material receptive to the interlayer addition of a polymeric oxide precursor. In particular, cetyltrimethylammonium cations have been found useful. These cations are readily incorporated within the interlayer spaces of the layered oxide serving to prop open the layers in such a way as to allow incorporation of the polymeric oxide precursor. The extent of the interlayer spacing can be controlled by the size of the organoammonium ion employed.

Interspathic oxide pillars, which may be formed between the layers of the propped or swollen oxide material, may include an oxide, preferably a polymeric oxide, of zirconium or titanium or more preferably of an element selected from Group IVB of the Periodic Table (Fischer Scientific Company Cat. No. 5-702-10, 1978), other than carbon, i.e., silicon, germanium, tin and lead. Other suitable oxides include those of Group VA, e.g., V, Nb, and Ta, those of Group IIA, e.g., Mg or those for Group IIIB, e.g., B. Most preferably, the pillars include polymeric silica. In addition, the oxide pillars may include an element which provides catalytically active acid sites in the pillars, preferably aluminum.

The oxide pillars are formed from a precursor material which may be introduced between the layers of the organic "propped" species as an ionic or electrically neutral compound of the desired elements, those of Group IVB. The precursor material may be an organometallic compound which is a liquid under ambient conditions. In particular, hydrolyzable compounds, e.g., alkoxides, of the desired elements of the pillars may be utilized as the precursors. Suitable polymeric silica precursor materials include tetraalkylsilicates, e.g., tetrapropylorthosilicate, tetramethylorthosilicate and, most preferably, tetraethylorthosilicate. Suitable polymeric silica precursor materials also include quaternary ammonium silicates, e.g., tetramethylammonium silicate (i.e., TMA silicate). Where the pillars also include polymeric alumina, a hydrolyzable aluminum compound can be contacted with the organic "propped" species before, after or simultaneously with the contacting of the propped layered oxide with the silicon compound. Preferably, the hydrolyzable aluminum compound employed is an aluminum alkoxide, e.g., aluminum isopropoxide. If the pillars are to include titania, a hydrolyzable titanium compound such as titanium alkoxide, e.g., titanium isopropoxide, may be used.

After calcination to remove the organic propping agent, the final product may contain residual exchangeable cations. Such residual cations in the material can be ion exchanged by known methods with other cationic species to provide or alter the catalytic activity of the pillared product. Suitable replacement cations include cesium, cerium, cobalt, nickel, copper, zinc, manganese, platinum, lanthanum, aluminum, ammonium, hydronium and mixtures thereof.

Particular procedures for intercalating layered materials with metal oxide pillars are described in U.S. Pat. Nos. 4,831,005; 4,831,006; and 4,929,587. The entire disclosures of these patents are expressly incorporated herein by reference. U.S. No. 4,831,005 describes plural treatments with the pillar precursor. U.S. No. 4,929,587 describes the use of an inert atmosphere, such as nitrogen, to minimize the formation of extralaminar polymeric oxide during the contact with the pillar precursor. U.S. No. 4,831,006 describes the use of elevated temperatures during the formation of the pillar precursor.

The resulting pillared products exhibit thermal stability at temperatures of 450° C. or even higher as well as substantial sorption capacities (as much as 17 to 40 wt% for $C_6$ hydrocarbon). The pillared products may possess a basal spacing of at least about 32.2A and surface areas greater than 500 m$^2$/g.

The swollen MCM-22 precursor material may be subjected to thermal treatment, e.g., to decompose organoammonium ions. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience.

In the as-synthesized form, MCM-49 appears to be a single crystalline phase. It can be prepared in essentially pure form with little or no detectable impurity crystal phases and has an X-ray diffraction pattern which is distinguished from the patterns of other known as-synthesized or thermally treated crystalline materials by the lines listed in Table 9 below:

TABLE 9

| Interplanar d-Spacing (A) | Relative Intensity, I/Io × 100 |
|---|---|
| 12.49 ± 0.24 | vs |
| 11.19 ± 0.22 | m–s |
| 6.43 ± 0.12 | w |
| 4.98 ± 0.10 | w |
| 4.69 ± 0.09 | w |
| 3.44 ± 0.07 | vs |
| 3.24 ± 0.06 | w |

In its calcined form, MCM-49 transforms to a single crystal phase with little or no detectable impurity crystal phases having an X-ray diffraction pattern which is not readily distinguished from that of MCM-22, but distinguishable from the patterns of other known crystalline materials. The X-ray diffraction pattern of the calcined form of MCM-49 includes the lines listed in Table 10 below:

TABLE 10

| Interplanar d-Spacing (A) | Relative Intensity, I/Io × 100 |
|---|---|
| 12.41 ± 0.24 | vs |
| 11.10 ± 0.22 | s |
| 8.89 ± 0.17 | m–s |
| 6.89 ± 0.13 | w |
| 6.19 ± 0.12 | m |
| 6.01 ± 0.12 | w |
| 5.56 ± 0.11 | w |
| 4.96 ± 0.10 | w |
| 4.67 ± 0.09 | w |
| 4.59 ± 0.09 | w |
| 4.39 ± 0.09 | w |
| 4.12 ± 0.08 | w |
| 4.07 ± 0.08 | w–m |

TABLE 10-continued

| Interplanar d-Spacing (A) | Relative Intensity, I/Io × 100 |
|---|---|
| 3.92 ± 0.08 | w–m |
| 3.75 ± 0.07 | w–m |
| 3.57 ± 0.07 | w |
| 3.43 ± 0.07 | s–vs |
| 3.31 ± 0.06 | w |
| 3.21 ± 0.06 | w |
| 3 12 ± 0.06 | w |
| 3.07 ± 0.06 | w |
| 2.83 ± 0.05 | w |
| 2.78 ± 0.05 | w |
| 2.69 ± 0.05 | w |
| 2.47 ± 0.05 | w |
| 2.42 ± 0.05 | w |
| 2.38 ± 0.05 | w |

MCM-49, in its calcined form, may have bulk silica:alumina ($SiO_2:Al_2O_3$) molar ratio of less than about 24:1, preferably less than about 20:1.

MCM-49 can be prepared from a reaction mixture containing sources of alkali or alkaline earth metal (M), e.g., sodium or potassium, cation, an oxide of trivalent element X, e.g., aluminum, an oxide of tetravalent element Y, e.g., silicon, hexamethyleneimine directing agent (R), and water, said reaction mixture having a composition, in terms of mole ratios of oxides, within the following ranges:

| Reactants | Useful | Preferred |
|---|---|---|
| $YO_2/X_2O_3$ | 12 to <35 | 18 to 31 |
| $H_2O/YO_2$ | 10 to 70 | 15 to 40 |
| $OH^-/YO_2$ | 0.05 to 0.50 | 0.05 to 0.30 |
| $M/YO_2$ | 0.05 to 3.0 | 0.05 to 1.0 |
| $R/YO_2$ | 0.2 to 1.0 | 0.3 to 0.5 |

In this synthesis method, if more than one X component is present, at least one must be present such that the $YO_2/x_2O_3$ molar ratio thereof is less than about 35. For example, if aluminum oxide and gallium oxide components are used in the reaction mixture, at least one of the $YO_2/Al2O3$ and $YO_2/Ga2O3$ molar ratios must be less than about 35. If only aluminum is present, the $YO_2/Al_2O_3$ ratio must be less than about 35.

The source of $YO_2$ may be soluble or insoluble, but is preferably comprised predominately of solid $YO_2$, for example at least about 30 wt.% solid $YO_2$ in order to obtain the crystal product of the invention. Where $YO_2$ is silica, the use of a silica source containing at least about 30 wt.% solid silica, e.g., Ultrasil (a precipitated, spray dried silica containing about 90 wt.% $SiO_2$) or HiSil (a precipitated hydrated silica containing about 87 wt.% $SiO_2$, about 6 wt.% free $H_2O$ and about 4.5 wt.% bound and $H_2O$ of hydration and having a particle size of about 0.02 micron) favors crystalline MCM-49 formation from the above mixture. Preferably, therefore, the solid $YO_2$, e.g., silica, source contains at least about 30 wt.% solid $YO_2$, e.g., silica, and more preferably at least about 40 wt.% solid $YO_2$, e.g., silica.

Crystallization of MCM-49 can be carried out at either static or stirred condition in a suitable reactor vessel, such as for example, polypropylene jars or teflon lined or stainless steel autoclaves. The total useful range of temperatures for crystallization is from about 80° C. to about 225° C. for a time sufficient for crystallization to occur at the temperature used, e.g., from about 24 hours to about 60 days. Thereafter, the crystals are separated from the liquid and recovered.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product. Useful seed crystals include MCM-22 and/or MCM-49.

Directing agent R for making MCM-22 or MCM-49 may be selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopioperazine, and combinations thereof.

The present catalyst can optionally be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. The present catalyst can also optionally be used in intimate combination with a rare earth component such as lanthanum or cerium. Such component can be associated chemically and/or physically with the catalyst. Thus, the hydrogenating component can be introduced into the catalyst composition by way of co-crystallization, exchanged into the composition to the extent a Group IIIA element, e.g., aluminum, is in the structure, impregnated therein or intimately physically admixed therewith. Such component can be impregnated in, or on, the catalyst such as, for example, by, in the case of platinum, treating the catalyst with a solution containing the platinum metal-containing ion. Thus, suitable platinum compounds for this purpose include chloroplatinic acid, platinous chloride and various compounds containing the platinum ammine complex.

The present catalyst must undergo thermal treatment. This thermal treatment is generally performed by heating the catalyst at a temperature of at least about 370° C. for at least 1 minute and generally not longer than 20 hours. While subatmospheric pressure can be employed for the thermal treatment, atmospheric pressure is preferred simply for reasons of convenience. The thermal treatment can be performed at a temperature of up to about 925° C.

Prior to its use as an alkylation catalyst in the process of this invention, the catalyst may be at least partially dehydrated. This dehydration can be accomplished by heating the catalyst to a temperature int he range of from about 200° C. to about 595° C. in an atmosphere such as air, nitrogen, etc., and at atmospheric, subatmospheric or superatmospheric pressures for a period of from between about 30 minutes to about 48 hours. Dehydration can also be performed at room temperature merely by placing the catalyst in a vacuum but a longer time will be required to achieve a suitable degree of dehydration.

The catalyst can be shaped into a wide variety of particle sizes. Generally speaking, the particles can be provided in the form of a powder, a granule or a molded product such as an extrudate having a particle size sufficient to pass through a 2 mesh (Tyler) screen and be substantially retained on a 400 mesh (Tyler) screen. In cases where the catalyst is molded, such as by extrusion, the crystals can be extruded before drying or partially dried and then extruded.

It is desired to incorporate the catalytically active crystalline material with another material, i.e., a binder, which is resistant to the temperatures and other conditions employed in the isoparaffin alkylation process of this invention. Suitable binder materials include active and inactive materials and synthetic or naturally occurring zeolites as well as inorganic materials such as clays, silica and/or metal oxides such as alumina. The latter can be either naturally occurring or provided in the form of gelatinous precipitates or gels including mixtures of silica and metal oxides. Use of a binder material in conjunction with the catalytically active crystalline material, i.e., combined therewith, which itself is catalytically active may change the conversion and/or selectivity of the catalyst. Inactive materials suitably serve as diluents to control the amount of conversion so that products can be obtained economically and in a controlled fashion without having to employ other means for controlling the rate of reaction. These materials can be incorporated into naturally occurring clays, e.g., bentonite and kaolin, to improve the crush strength of the catalyst under commercial operating conditions. Good crush strength is an advantageous attribute for commercial use since it prevents or delays breaking down of the catalyst into powder-like materials.

Naturally occurring clays which can be composited with the present catalyst crystals include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with catalyst crystals also include inorganic oxides, notably alumina.

The alumina binder may undergo a phase transformation during calcination, whereby the water solubility of the alumina is decreased. The hydroxyl content of the alumina may be decreased by calcination. In particular, calcination may transform the pseudoboehmite form of alumina into gamma-alumina.

Apart from or in addition to the foregoing binder materials, the present catalyst crystals can be composited with an inorganic oxide matrix such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia, silica-magnesia-zirconia, etc. It may be advantageous to provide at least a part of the foregoing matrix materials in colloidal form so as to facilitate extrusion of the catalyst component(s).

The relative proportions of finely divided catalyst crystals and inorganic oxide matrix can vary widely with the catalyst crystals content ranging from about 1 to about 95 percent by weight and more usually, particularly when the composite is prepared in the form of beads, in the range of about 2 to about 80 weight percent of the composite.

The operating temperature of the alkylation process herein can extend over a fairly broad range, e.g., from about +25° to about 400° C., and is preferably within the range of from about 75° C. to about 200° C. The practical upper operating temperature will often be dictated by the need to avoid an undue occurrence of undesirable side reactions.

The pressures employed in the present process can extend over a considerably wide range, from subatmospheric pressure to about 5000 psig, and preferably from atmospheric pressure to about 2000 psig.

The amount of catalyst used in the present alkylation process can be varied over relatively wide limits. In general, the amount of catalyst as measured by the weight hourly space velocity (WHSV) based on olefin can range from about 0.01 to about 100 hr $^{-1}$ preferably from 0.04 to 5 hr $^{-1}$. It will, of course, be realized by those skilled in the art that the amount of catalyst selected for a particular reaction will be determined by several variables including the reactants involved as well as the nature of the catalyst and the operating conditions employed.

The isoparaffin reactant used in the present alkylation process may be one possessing up to about 20 carbon atoms and preferably one having from about 4 to about 8 carbon atoms as, for example, isobutane, 3-methylhexane, 2-methylbutane, 2,3-dimethylbutane and 2,4-dimethylhexane.

The olefin reactant employed herein generally contains from 2 to about 12 carbon atoms. Representative examples are ehtene, propene, butene-1, butene-2, isobutene, pentenes, hexenes, heptenes and octenes. Particularly preferred are $C_3$ and $C_4$ olefins and mixtures thereof.

In general, the mole ratio of total isoparaffin to total olefin alkylating agent in the combined hydrocarbon feed can be from about 1:2 to about 500:1 and is preferably in the range of from about 5:1 to about 100:1. The isoparaffin and/or olefin reactants can be in the vapor phase, the liquid phase and/or a supercritical state and can be neat, i.e., free from intentional admixture of dilution with other material, or the reactants can be brought into contact with the catalyst composition with the aid of carrier gases or diluents such as, for example, hydrogen or nitrogen. The reactants also may optionally be introduced to the alkylation reaction zone together with one or more other reactive materials which may serve to enhance the overall conversion operation. Thus, for example, relatively small quantities of hydrogen and/or hydrogen donors can be present in the reaction zone.

The alkylation process of the present invention can be carried out as a batch-type, semi-continuous or continuous operation utilizing a fixed or moving bed of the catalyst component. A preferred embodiment entails use of a catalyst zone wherein the hydrocarbon charge is passed concurrently or countercurrently through a moving bed of particle-form catalyst. The latter, after use, is conducted to a regeneration zone where coke is removed, e.g., by burning in an oxygen-containing atmosphere (such as air) at elevated temperature or by extracting with a solvent, after which the regenerated catalyst is recycled to the conversion zone for further contact with the organic reactants. Particular process configurations and variations may be arrived at by substituting the present catalyst for the catalyst as described in the aforementioned U.S. Pat. Nos. 4,992,615; 5,012,033; and 5,073,665.

Alpha Values are reported hereinafter for various materials. It is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec $^{-1}$). The Alpha Test is described in U.S. Pat. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test preferably include a constant temperature of 538° C. and a variable flow rate as described in detail in the *Journal of Catalysis*, Vol. 61, p. 395.

EXAMPLE 1

SYNTHESIS OF MCM-22 PRECURSOR 1.70 parts of 45% sodium aluminate solution were added to a solution containing 1.0 parts of 50% NaOH solution and 43.0 parts of $H_2O$ in an autoclave. 8.57 parts of Ultrasil precipitated silica were added with agitation, followed by 4.51 parts of hexamethyleneimine (HMI).

The reaction mixture had the following composition, in mole ratios:

| | |
|---|---|
| $SiO_2Al_2O_3$ = | 30 |
| $OH^-/SiO_2$ = | 0.18 |
| $R/SiO_2$ = | 0.35 |
| $H_2O/SiO_2$ = | 19.4 | where R is the organic, HMI.

The mixture was crystallized at 149° C. for 78 hours with stirring. The chemical composition of the product was, in wt.%:

| | |
|---|---|
| N | 1.80 |
| Na | 0.50 |
| $Al_2O_3$ | 5.5 |
| $SiO_2$ | 76.2 |
| Ash | 80.5 |
| $SiO_2/Al_2O_3$ mole ratio | 23.5/1 |

The sorption capacities, after calcining at 538° C. for 6 hours were, in wt. %:

| | |
|---|---|
| Cyclohexane, 40 Torr | 12.6 |
| N-Hexane, 40 Torr | 9.3 |
| $H_2O$, 12 Torr | 15.3 |

EXAMPLE 2

PREPARATION OF 65% MCM-22/35$Al_2O_3$ EXTRUDATE

A portion of the MCM-22 precursor wetcake from Example 1 was dried and the resultant MCM-22 precursor drycake was mixed with alumina, in proportions to give 65% MCM-22/35% alumina on a 100% solids basis. Deionized (DI) water was added to give an extrudable mull and the mix was extruded to 1/16 inch diameter and dried at 120° C.

COMPARATIVE EXAMPLE A-PREPARATION OF MCM-22 CATALYST WITH INITIAL CALCINATION

A portion of the MCM-22 alumina extrudate from Example 2 was calcined in flowing nitrogen at 540° C. for 3 hours. It was then charged to a column and exchanged 2 times for 1 our with 1N $NH_4NO_3$ solution (10 ml solution per gram of extrudate) at room temperature, washed with deionized (DI) water, and dried at 120° C. It was then calcined in flowing air at 540° C. for 6 hours.

EXAMPLE 3

PREPARATION OF MCM-22 CATALYST WITHOUT INITIAL CALCINATION

A portion of the MCM-22 alumina extrudate from Example 2 was charged to a column and exchanged 2 times for 1 hour with in $NH_4NO_3$ solution (10 ml solution per gram of extrudate) at room temperature, washed with DI water, and dried at 120° C. It was calcined in flowing nitrogen at 540° C. for 3 hours and then in flowing air at 540° C. for 6 hours.

EXAMPLE 4

PREPARATION OF SWOLLEN PRECURSOR 25 ml of a 29% cetyltrimethylammonium chloride (CTMA-Cl) solution and 6.75 gm of 50% tetrapropylammonium hydroxide (TPA-OH) solution were charged to an autoclave for each gram of MCM-22 precursor wetcake (100% solids basis). The resulting slurry was then reacted at 100° C. for 24 hours with stirring. The slurry was cooled, filtered, washed with deionized (DI) water, and dried at 100° C.

COMPARATIVE EXAMPLE B-PREPARATION OF SWOLLEN PRECURSOR CATALYST WITH INITIAL CALCINATION

A portion of the swollen MCM-22 precursor drycake from Example 4 was mixed with alumina, in proportions to give 65% swollen MCM-22 precursor/35% alumina on a 100% solids basis. DI water was added to give an extrudable mull and the mix was extruded to 1/16 inch diameter and dried at 120° C. The extrudate was calcined in flowing nitrogen at 540° C. for 3 hours. It was then charged to a column and exchanged 2 times for 1 hour with 1N $NH_4NO_3$ solution (10 ml solution per gram of extrudate) at room temperature, washed with DI water, and dried at 120° C. It was finally calcined in flowing air at 540° C. for 6 hours.

EXAMPLE 5

PREPARATION OF SWOLLEN PRECURSOR WITHOUT INITIAL CALCINATION

A portion of the swollen MCM-22 precursor drycake was mixed with alumina, in proportions to give 65% swollen MCM-22 precursor/35% alumina on a 100% solids basis. DI water was added to give an extrudable mull and the mix was extruded to 1/16 inch diameter and dried at 120° C. The extrudate was charged to a column and exchanged 2 times for 1 hour with in $NH_4NO_3$ solution (10 ml solution per gram of extrudate) at room temperature, washed with DI water, and dried at 120° C. It was then calcined in flowing nitrogen at 540° C. for 3 hours and in flowing air at 540° C. for 6 hours.

EXAMPLE 6

PREPARATION OF MCM-22 CATALYST WITHOUT INITIAL CALCINATION

A sample of the MCM-22 precursor of Example 1 was mixed with pseudoboehmite (La Roche Versal 250) in a 65% MCM-22/35% $Al_2O_3$ ratio in a muller mixer. Water was added to the mixture and the resultant mixture was extruded to form a 1/16 inch extrudate. The extrudate was dried at 120° C. overnight. The dried extrudate was ammonium exchanged 3 times with in NH₄NO₃ at room temperature. The catalyst was washed and dried at 120° C. overnight. The catalyst was then calcined in N₂ at 482° C. and in air at 538° C.

COMPARATIVE EXAMPLE C-PREPARATION OF MCM-22 CATALYST WITH INITIAL CALCINATION

A sample of the MCM-22 precursor of Example 1 was mixed with pseudoboehmite (La Roche Versal 250) in a 65% MCM-22/35% Al₂O₃ ratio in a muller mixer. Water was added to the mixture and the resultant mixture was extruded to form a 1/16 inch extrudate. The extrudate was dried at 120° C. overnight. The catalyst was calcined in N₂ to 482° C. The catalyst was ammonium exchanged 3 times with 1N NH₄NO₃ at room temperature. The catalyst was washed and dried overnight at 120° C. and calcined in air at 538° C.

EXAMPLE 7
SYNTHESIS OF AS-SYNTHESIZED MCM-49

2.24 parts of 45% sodium aluminate solution were added to a solution containing 1.0 part of 50% NaOH solution and 43.0 parts of H₂O in an autoclave. 8.57 parts of Ultrasil precipitated silica were added with agitation, followed by 4.51 parts of HMI.

The reaction mixture had the following composition, in mole ratios:

$SiO_2/Al_2O_3 = 23$
$OH^-/SiO_2 = 0.21$
$R/SiO_2 = 0.35$
$H_2O/SiO_2 = 19.3$

The mixture was crystallized at 150° C. for 84 hours with stirring. The chemical composition of the product was, in wt.%:

| | |
|---|---|
| N | 1.70 |
| Na | 0.70 |
| Al₂O₃ | 7.3 |
| SiO₂ | 74.5 |
| Ash | 84.2 |
| SiO₂/Al₂O₃ mole ratio | 17.3/1 |

The sorption capacities, after calcining at 538° C. for 9 hours were, in wt.%:

| | |
|---|---|
| Cyclohexane, 40 Torr | 10.0 |
| N-Hexane, 40 Torr | 13.1 |
| H₂O, 12 Torr | 15.4 |

EXAMPLE 8
PREPARATION OF MCM-49 CATALYST WITHOUT INITIAL CALCINATION

A sample of the as-synthesized MCM-49 of Example 7 was mixed with pseudoboehmite (La Roche Versal 250) in a 65% MCM-49/35% Al₂O₃ ratio in a muller mixer. Water was added to the mixture and the resultant mixture was extruded to form a 1/16 inch extrudate. The extrudate was dried at 120° C. overnight. The dried extrudate was ammonium exchanged 3 times with in NH₄NO₃ at room temperature. The catalyst was washed and dried at 120° C. for overnight. The catalyst was then calcined in N₂ at 482° C. and air at 538° C.

COMPARATIVE EXAMPLE D-PREPARATION OF MCM-49 CATALYST WITH INITIAL CALCINATION

A sample of the as-synthesized MCM-49 of Example 7 was mixed with alumina (La Roche Versal 250) in a muller. Water was added to the mixture. The resultant mixture was extruded to form a 1/16 inch extrudate. The extrudate was dried at 120° C. overnight. The dried extrudate catalyst was then calcined in N₂ to 482° C. The catalyst was ammonium exchanged with 1N NH₄NO₃ for 3 times at room temperature. The catalyst was washed and dried overnight at 120° C. and calcined in air at 538° C.

Properties of the catalysts of Examples 3, 5, 6, and 8 along with properties of the catalysts of comparative Examples A, B, C, and D are given in Table 11.

TABLE 11

| Catalyst of Example or Comparative Example | A | 3 | B | 5 | C | 6 | D | 8 |
|---|---|---|---|---|---|---|---|---|
| Na, ppm | 54 | 130 | 105 | 78 | 220 | 250 | 375 | 240 |
| Alpha | 254 | 274 | 119 | 127 | 236 | 246 | 212 | 251 |
| S.A., m²/g | 436 | 434 | 421 | 561 | 198 | 422 | 381 | 418 |
| Cy-C₆, wt. % @ 40 Torr | 10.1 | 11.2 | 12.7 | 17.3 | 9.4 | 12.5 | 12.5 | 13.3 |

EXAMPLE 9
ALKYLATIONS

The pilot unit evaluations were carried out in a fixed-bed reactor at 700 psig and 149° C. (300° F.) using a 50/1 isobutane/2-butene feed. The activity and product selectivity were monitored by gas chromatographic analysis of the off-gas and liquid product using a fused silica capillary column (Alltech's Durabond DB- 1 ).

The isobutane and isobutane/2-butene feeds (both C.P. Grade) were all obtained from Matheson Gas Products and used without further purification.

The alkylation activity and selectivity obtained with a number of catalysts are summarized in Table 12. These results clearly show that superior alkylation catalyst are obtained when the ammonium exchange is carried out prior to any initial calcination.

TABLE 12

Comparison of Alkylation Activity and Selectivity of Various Catalysts With and Without Initial Calcination

| Catalyst | MCM-22 | | MCM-49 | | Swollen MCM-22 | |
|---|---|---|---|---|---|---|
| Example | 6 | C | 8 | D | 5 | B |
| Initial Calcination | No | Yes | No | Yes | No | Yes |
| Time on stream, days | 3–6 | 1–4 | 4–9 | 4–6 | 1–3 | 1–2 |

TABLE 12-continued

Comparison of Alkylation Activity and Selectivity of
Various Catalysts With and Without Initial Calcination

| Catalyst | MCM-22 | | MCM-49 | | Swollen MCM-22 | |
|---|---|---|---|---|---|---|
| Olefin WHSV, hr$^{-1}$ | 0.10 | 0.10 | 0.05 | 0.05 | 0.10 | 0.10 |
| Olefin Conv., % | 94.7 | 86.7 | 97.5 | 93.3 | 96.7 | 82.8 |
| C$_5$+ Yield, g/g | 1.6 | 1.6 | 1.8 | 1.8 | 1.7 | 1.4 |
| C$_4$ = conv. | | | | | | |
| C$_5$+ Composition, %: | | | | | | |
| C$_5$–C$_7$ | 24 | 20 | 26 | 20 | 28 | 19 |
| C$_8$ | 60 | 63 | 58 | 64 | 56 | 57 |
| C$_9$+ | 16 | 17 | 16 | 16 | 17 | 23 |
| TMP/(C$_8$-TMP) | 2.1 | 1.8 | 2.4 | 2.2 | 1.9 | 1.3 |

What is claimed is:

1. A method for preparing a catalyst, said method comprising the steps of:

(a) preparing a reaction mixture comprising a source of at least one oxide, water and an organic directing agent, wherein said reaction mixture is capable of forming a crystalline oxide material upon being subjected to sufficient crystallization conditions, said crystalline oxide material, in as-synthesized form, having an X-ray diffraction pattern comprising the following lines:

| d(A) | I/I$_o$ |
|---|---|
| 12.18–12.73 | m–vs |
| 10.93–11.41 | w–s |
| 6.74–7.04 | w–m |
| 4.37–4.60 | w–m |
| 3.84–4.03 | w–vs |
| 3.50–3.62 | w–m |
| 3.37–3.51 | m–vs |
| 3.27–3.41 | w–s; |

(b) maintaining said reaction mixture of step (a) under conditions sufficient to form said as-synthesized crystalline oxide material;

(c) recovering said as-synthesized crystalline oxide material comprising residual organic directing agent;

(d) mulling and extruding the uncalcined, as-synthesized crystalline material recovered in step (c) with a binder material under conditions sufficient to form an extrudate having a green strength sufficient to withstand processing as described in subsequent steps of this method, the crush strength of the green strength extrudate being capable of being improved by calcination thereof;

(e) exchanging ions in the crystalline material in the green strength extrudate of step (d) with ammonium ions, said extrudate in this step not having been subjected to calcination conditions sufficient decompose and/or oxidize the residue of the organic directing agent in the crystalline oxide material; and (f) calcining the exchanged extrudate of step (e) for the first time under conditions sufficient to (1) decompose ammonium ions, (2) decompose and/or oxidize residual organic directing agent, and (3) convert the green strength extrudate into a calcined extrudate having improved crush strength.

2. A method according to claim 1, wherein said as-synthesized crystalline oxide material recovered in step (c) has the X-ray diffraction pattern comprising the following lines:

| d(A) | I/I$_o$ |
|---|---|
| 13.53 ± 0.2 | m–vs |
| 12.38 ± 0.2 | m–vs |
| 11.13 ± 0.2 | w–s |
| 9.15 ± 0.15 | w–s |
| 6 89 ± 0.15 | w–m |
| 4.47 ± 0.10 | w–m |
| 3 95 ± 0.08 | w–vs |
| 3.56 ± 0.06 | w–m |
| 3.43 ± 0.06 | m–vs |
| 3.36 ± 0.05 | w–s. |

3. A method according to claim 2, wherein said crystalline oxide material is an aluminosilicate and wherein said as-synthesized crystalline oxide material is capable of forming a material designated MCM-22 upon calcination thereof.

4. A method according to claim 1, wherein said as-synthesized crystalline oxide material recovered in step (c) has the X-ray diffraction pattern comprising the following lines:

| d(A) | I/I$_o$ |
|---|---|
| 13.15 ± 0.26 | w–s (shoulder) |
| 12.49 ± 0.24 | vs |
| 11.19 ± 0.22 | m–s |
| 6.43 ± 0.12 | w |
| 4.98 ± 0.10 | w |
| 4.69 ± 0.09 | w |
| 3.44 ± 0.07 | vs |
| 3.24 ± 0.06 | w. |

5. A method according to claim 4, wherein said crystalline oxide material is an aluminosilicate having a silica to alumina molar ratio of less than about 35 and wherein said as-synthesized crystalline oxide material is the as-synthesized form of a material designated MCM-49.

6. A method according to claim 1, wherein said binder is alumina and wherein said alumina undergoes a phase transformation during calcination step (f), whereby the water solubility of the alumina is decreased.

7. A method according to claim 1, wherein said binder is alumina, wherein said crystalline oxide material is an aluminosilicate material and wherein the hydroxyl content of the alumina binder is decreased by the calcination step (f).

8. A method according to claim 7, wherein said binder material of step (d) is pseudoboehmite and wherein the alumina of the calcined extrudate of step (f) comprises gamma-alumina.

9. A method according to claim 1, wherein said reaction mixture of step (a) comprises alkali or alkaline earth metal cations, a source of silica and a source of alumina.

10. A method according to claim 9, wherein said organic directing agent is selected from the group consisting of heterocyclic imines, cycloalkyl amines and adamantane quaternary ammonium ions.

11. A method according to claim 9, wherein said organic directing agent is selected from the group consisting of hexamethyleneimine, 1,4-diazacycloheptane, azacyclooctane, aminocyclohexane, aminocycloheptane, aminocyclopentane, N,N,N-trimethyl-1-adamantanammonium ions, and N,N,N-trimethyl-2-adamantanammonium ions.

12. A method according to claim 9, wherein said organic directing agent is hexamethyleneimine.

13. A method according to claim 5, wherein said silica to alumina molar ratio is from about 10 to less than about 35.

14. A method according to claim 5, wherein said silica to alumina molar ratio is from about 15 to about 31.

15. A method for preparing a catalyst, said method comprising the steps of:

(a) preparing a reaction mixture comprising a source of at least one oxide, water and an organic directing agent, wherein said reaction mixture is capable of forming a crystalline oxide material upon being subjected to sufficient crystallization conditions, said crystalline oxide material, in as-synthesized form, having an X-ray diffraction pattern comprising the following lines:

| d(A) | I/I$_o$ |
|---|---|
| 12.18–12.73 | m-vs |
| 10.93–11.41 | w-s |
| 6.74–7.04 | w-m |
| 4.37–4.60 | w-m |
| 3.84–4.03 | w-vs |
| 3.50–3.62 | w-m |
| 3.37–3.51 | m-vs |
| 3.27–3.41 | w-s; |

(b) maintaining said reaction mixture of step (a) under conditions sufficient to form said as-synthesized crystalline oxide material;

(c) recovering said as-synthesized crystalline oxide material comprising residual organic directing agent;

(d) contacting said as-synthesized crystalline material of step (c) with an organic swelling agent under conditions sufficient to swell said as-synthesized material, thereby forming a non-pillared swollen material having an X-ray diffraction pattern comprising the following lines:

| d(A) | I/I$_o$ |
|---|---|
| >32.2 | vs |
| 12.41 ± 0.25 | w-s |
| 3.44 ± 0.07 | w-s |

(e) mulling and extruding the uncalcined, non-pillared swollen material recovered in step (d) with a binder material under conditions sufficient to form an extrudate having a green strength sufficient to withstand processing as described in subsequent steps of this method, the crush strength of the green strength extrudate being capable of being improved by calcination thereof;

(f) exchanging ions in the crystalline material in the green strength extrudate of step (e) with ammonium ions, said extrudate in this step not having been subjected to calcination conditions sufficient to decompose and/or oxidize the residue of the organic directing agent or the organic swelling agent in the non-pillared swollen material; and (g) calcining the exchanged extrudate of step (f) for the first time under conditions sufficient to (1) decompose ammonium ions, (2) decompose and/or oxidize residual organic directing agent and organic swelling agent, and (3) convert the green strength extrudate into a calcined extrudate having improved crush strength.

16. A method according to claim 15, wherein said organic swelling agent is a cetyltrimethylammonium compound.

17. A catalyst prepared according to the method of claim 1.

18. A catalyst prepared according to the method of claim 3.

19. A catalyst prepared according to the method of claim 5.

20. A catalyst prepared according to the method of claim 15.

21. A method according to claim 1, wherein the temperature of the calcination step (f) is at least 370° C.

* * * * *